(12) United States Patent
Qiu et al.

(10) Patent No.: US 9,337,909 B2
(45) Date of Patent: May 10, 2016

(54) COMMUNICATION DEVICE OF MOBILE TERMINAL AND MOBILE TERMINAL

(71) Applicant: HUIZHOU TCL MOBILE COMMUNICATION CO., LTD, HuiZhou, Guangdong (CN)

(72) Inventors: Shengfang Qiu, HuiZhou (CN); Xiaowei Wu, HuiZhou (CN); Ruyun Gan, HuiZhou (CN); Lijun Zhu, HuiZhou (CN)

(73) Assignee: HUIZHOU TCL MOBILE COMMUNICATION CO., LTD, Guangdong (CN)

( * ) Notice: Subject to any disclaimer, the term of this patent is extended or adjusted under 35 U.S.C. 154(b) by 0 days.

(21) Appl. No.: 14/411,386

(22) PCT Filed: Aug. 16, 2013

(86) PCT No.: PCT/CN2013/081679
§ 371 (c)(1),
(2) Date: Dec. 25, 2014

(87) PCT Pub. No.: WO2014/187035
PCT Pub. Date: Nov. 27, 2014

(65) Prior Publication Data
US 2015/0229365 A1 Aug. 13, 2015

(30) Foreign Application Priority Data

May 20, 2013 (CN) .......................... 2013 1 0186951

(51) Int. Cl.
*H04B 7/04* (2006.01)
*H01Q 1/24* (2006.01)
*H01Q 1/52* (2006.01)
*H04B 1/18* (2006.01)

(52) U.S. Cl.
CPC ............. *H04B 7/0413* (2013.01); *H01Q 1/243* (2013.01); *H01Q 1/521* (2013.01); *H04B 1/18* (2013.01)

(58) Field of Classification Search
CPC ...................................................... H04B 7/0413
USPC ....................... 455/575.1, 550.1, 562.1, 575.7
See application file for complete search history.

(56) References Cited

U.S. PATENT DOCUMENTS

| 8,736,513 | B2 | 5/2014 | Christie et al. |
| 9,008,728 | B2 * | 4/2015 | Abdul-Gaffoor et al. .......................... 455/562.1 |
| 2009/0140936 | A1 | 6/2009 | Cho et al. |
| 2010/0302110 | A1 | 12/2010 | Leem |
| 2013/0069841 | A1 * | 3/2013 | Lee et al. ...................... 343/846 |

FOREIGN PATENT DOCUMENTS

| CN | 101853977 | 10/2010 |
| CN | 101888011 | 11/2010 |
| CN | 201877562 | 6/2011 |
| CN | 202602721 | 12/2012 |
| CN | 102859793 | 1/2013 |
| CN | 202712437 | 1/2013 |

* cited by examiner

Primary Examiner — Tuan H Nguyen
(74) Attorney, Agent, or Firm — Mark M. Friedman

(57) ABSTRACT

A communication device of a mobile terminal and a mobile terminal are provided. The communication device includes a communication module mainboard that has a communication module disposed thereon; a main antenna that is coupled to the communication module mainboard; a MIMO antenna capable of enhancing signals; and a MIMO board coupled to the communication module mainboard via a spring contact plate; and the MIMO antenna is coupled to the MIMO board via a coaxial cable. Since the main antenna and the MIMO antenna are separately disposed, their interference can be reduced, and the overlapping disposal of the main antenna and the MIMO antenna can be avoided, and the thickness of the mobile terminal can be reduced. The MIMO antenna is coupled to the communication module via the coaxial cable, so the MIMO antenna can be freely adjusted and disposed anywhere within the mobile terminal.

14 Claims, 4 Drawing Sheets

COMMUNICATION DEVICE OF MOBILE TERMINAL AND MOBILE TERMINAL

CROSS-REFERENCE TO RELATED APPLICATIONS

This application claims the benefit of PCT International Application Ser. No. PCT/CN2013/081679, filed Aug. 16, 2013, which in turn claims priority to China Patent Application No. 201310186951.8, filed May 20, 2013.

TECHNICAL FIELD OF THE INVENTION

The present invention relates to a mobile terminal technology, and in particular to a communication device of a mobile terminal and a mobile terminal.

BACKGROUND OF THE INVENTION

MIMO (Multiple Input Multiple Output) system is a core technology used in 802.11n. 802.11n is a whole new wireless LAN technology following 802.11b\a\g by IEEE (Institute of Electrical and Electronic Engineers), reaching speeds of up to 600 Mbps.

It is more prevalent that modules are used in products. Moreover, there are already approaches that integrate a main antenna in a module. However, in fact, many products need to be compatible with a lot of bands, so performance requirements of the antenna are higher. In order to enhance signals, it not only needs the main antenna but also needs a sub-antenna. Ordinary 4G (Generation) antenna employs a single-board design. The main antenna and the sub-antenna are coupled to a mainboard through coaxial cables. Due to a restricted space, the two antennas interfere with each other because they are too close to each other, the performance being below standard.

SUMMARY OF THE INVENTION

The present invention provides a communication device of a mobile terminal aimed at the problem existing in the prior art. An objective is to reduce the interference between the main antenna and the sub-antenna, and to make the mobile terminal thinner.

The present invention is achieved by: a communication device of a mobile terminal, which includes: a communication module mainboard having a communication module disposed thereon; a main antenna coupled to the communication module mainboard; a multiple input multiple output (MIMO) antenna utilized to enhance signals; and a MIMO board coupled to the communication module mainboard; wherein the MIMO antenna is coupled to the MIMO board via a coaxial cable, and the main antenna is directly disposed on the communication module mainboard and coupled to the communication module via wires on the communication module mainboard.

In the communication device of a mobile terminal, the communication module mainboard has a spring contact plate disposed thereon, and the spring contact plate is utilized to make the MIMO board be removably coupled to the communication module mainboard.

In the communication device of a mobile terminal, the MIMO board is a removable MIMO board.

In the communication device of a mobile terminal, the main antenna and the MIMO antenna are separately disposed.

In the communication device of a mobile terminal, the MIMO antenna is a 4G (Generation) antenna.

In the communication device of a mobile terminal, the MIMO antenna meets 3G (Generation) spectrum requirements.

In the communication device of a mobile terminal, the spring contact plate includes: a fixing portion fixed to the communication module mainboard; a bending portion in which the spring contact plate bends; an elastic portion utilized to generate elasticity; and an abutting portion utilized to abut the MIMO board; wherein the fixing portion transitions into the elastic portion via the bending portion, and one end of the elastic portion is coupled to the abutting portion, and the abutting portion relative to the elastic portion represents a convex shape.

In the communication device of a mobile terminal, the MIMO board has a copper foil conductive region disposed thereon, and the copper foil conductive region is utilized to contact the abutting portion of the spring contact plate.

A communication device of a mobile terminal, comprising: a communication module mainboard having a communication module disposed thereon; a main antenna coupled to the communication module mainboard; a MIMO antenna utilized to enhance signals; and a MIMO board coupled to the communication module mainboard; wherein the MIMO antenna is coupled to the MIMO board via a coaxial cable.

In the communication device of a mobile terminal, the communication module mainboard has a spring contact plate disposed thereon, and the spring contact plate is utilized to make the MIMO board be removably coupled to the communication module mainboard.

In the communication device of a mobile terminal, the MIMO board is a removable MIMO board.

In the communication device of a mobile terminal, the main antenna and the MIMO antenna are separately disposed.

In the communication device of a mobile terminal, the MIMO antenna is a 4G antenna.

In the communication device of a mobile terminal, the MIMO antenna meets 3G spectrum requirements.

In the communication device of a mobile terminal, the spring contact plate includes: a fixing portion fixed to the communication module mainboard; a bending portion in which the spring contact plate bends; an elastic portion utilized to generate elasticity; and an abutting portion utilized to abut the MIMO board; wherein the fixing portion transitions into the elastic portion via the bending portion, and one end of the elastic portion is coupled to the abutting portion, and the abutting portion relative to the elastic portion represents a convex shape.

In the communication device of a mobile terminal, the MIMO board has a copper foil conductive region disposed thereon, and the copper foil conductive region is utilized to contact the abutting portion of the spring contact plate.

A mobile terminal includes the communication device of a mobile terminal. Since the main antenna and the MIMO antenna are separately disposed, the communication device of a mobile terminal provided by the present invention reduces their interference, avoids the main antenna and MIMO antenna being overlappingly disposed, and decreases a thickness of the mobile terminal. The MIMO antenna is coupled to the communication module via the coaxial cable, so the MIMO antenna can be freely adjusted and disposed anywhere within the mobile terminal.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts.

DETAILED DESCRIPTION OF THE INVENTION

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

Figure 1:
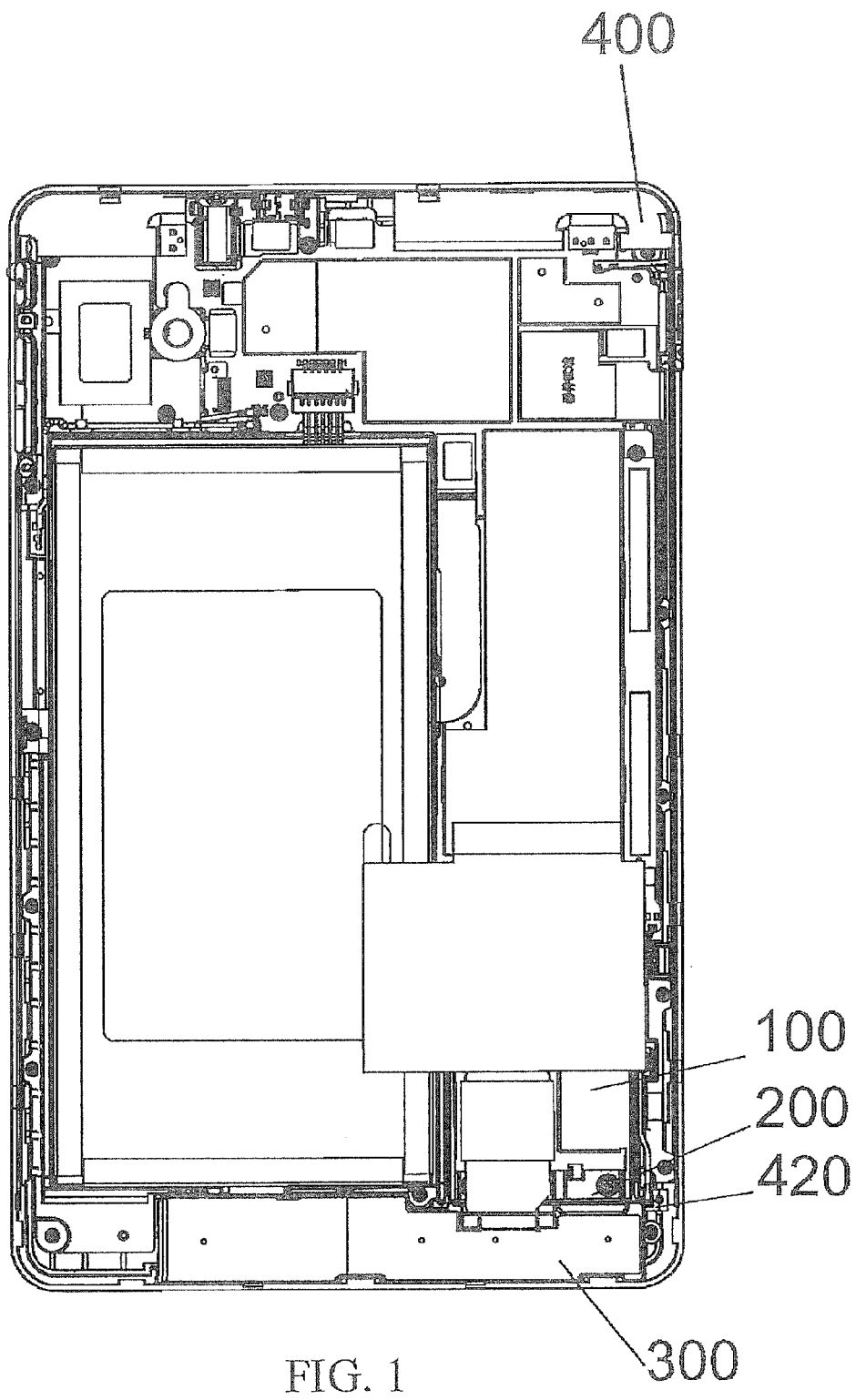
FIG. 1 is a schematic drawing illustrating a communication device being assembled in a mobile terminal according to the present invention.
Figure 2:
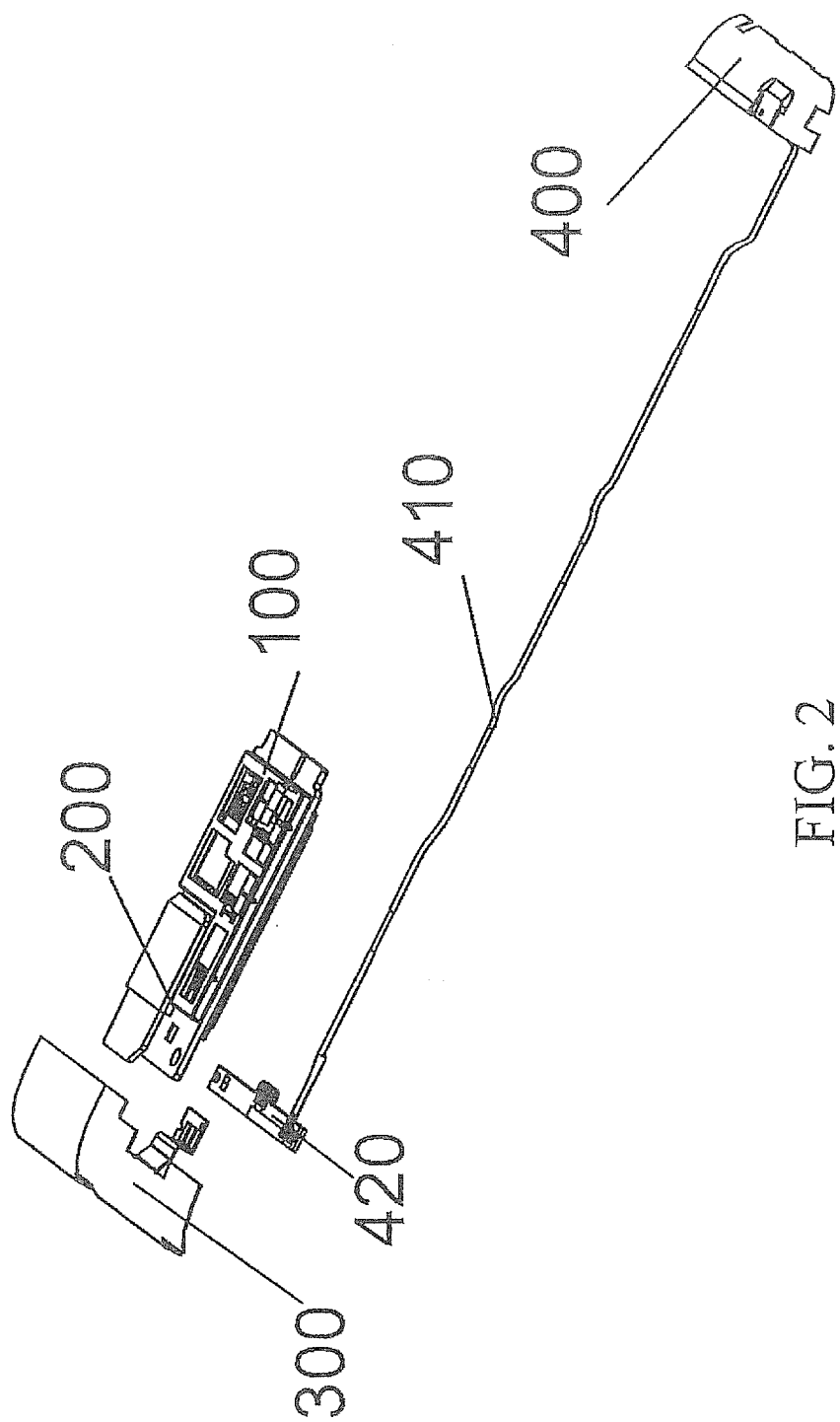
FIG. 2 is an exploded view of the communication device of the present invention.
Figure 3:
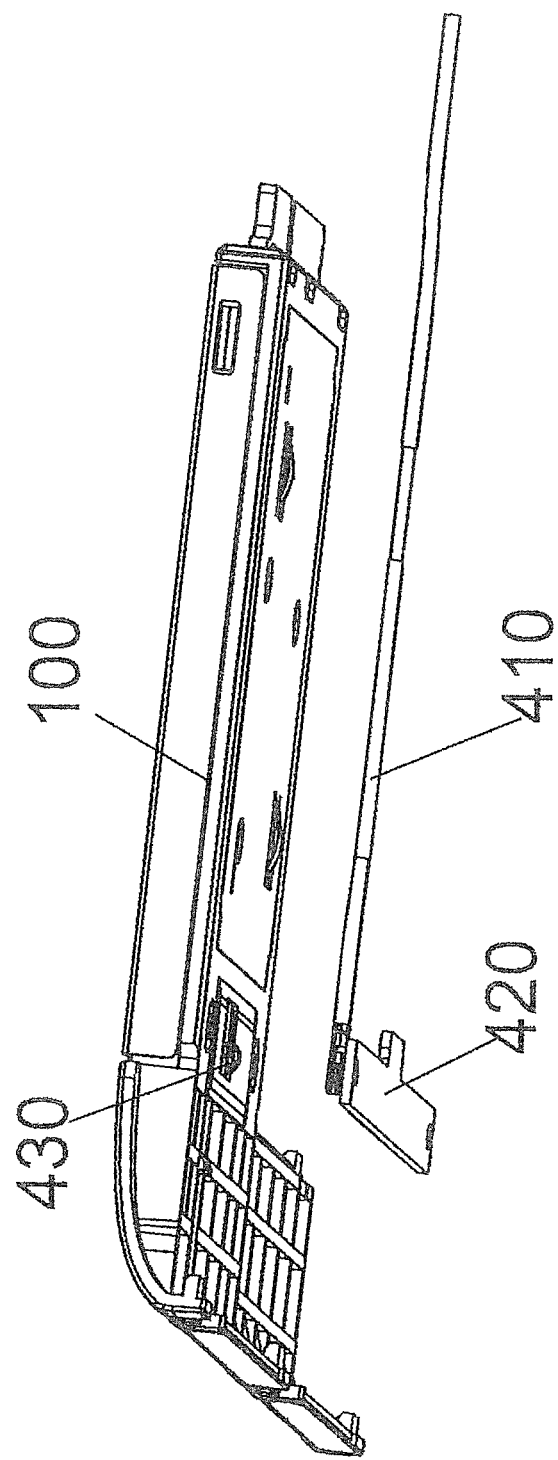
FIG. 3 a perspective view illustrating a spring contact plate and a MIMO board of the communication device of the present invention before assembly.
Figure 4:
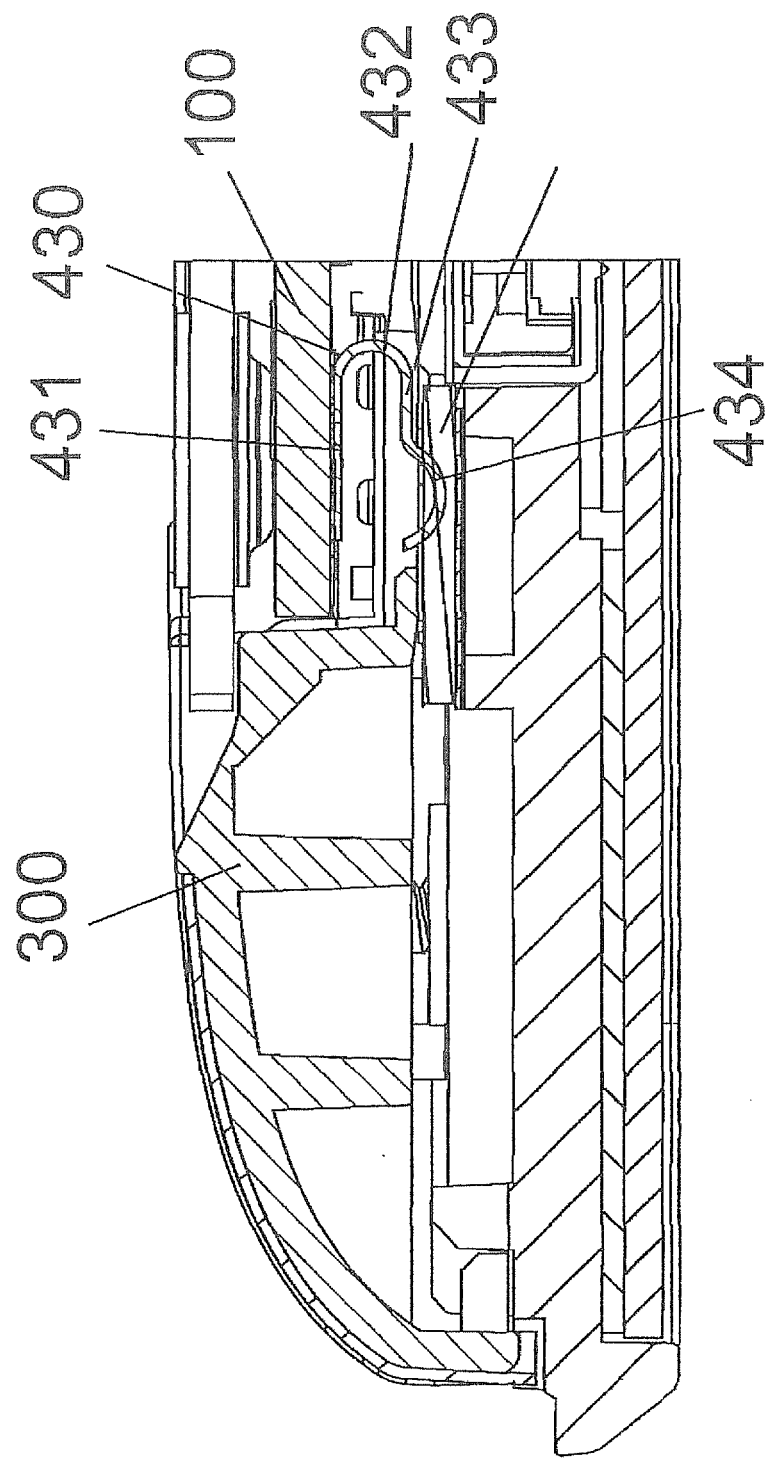
FIG. 4 is a sectional view illustrating the spring contact plate and the MIMO board of the communication device of the present invention after assembly.

The embodiment provides a communication device of a mobile terminal and a mobile terminal. As shown in FIG. 1, the mobile terminal has a housing, and the communication device is disposed within the housing. As shown in FIG. 2, the communication device includes a communication module mainboard 100, a communication module 200, a main antenna 300, and a MIMO (Multiple Input Multiple Output) antenna 400. The communication module 200 is disposed on the communication module mainboard 100. The main antenna 300 is directly disposed on the communication module mainboard 100 and coupled to the communication module 200 via wires on the communication module mainboard 100. The MIMO antenna 400 is coupled to the communication module 200 via a coaxial cable 410. Specifically, as shown in FIG. 3 and FIG. 4, the communication module mainboard 100 has a spring contact plate 430 disposed thereon, and the spring contact plate 430 is coupled to the communication module 200. There is a MIMO board 420 that is disposed at one end of the coaxial cable 410 coupled to the communication module 200. The MIMO board 420 is abuttingly coupled to the spring contact plate 430. The MIMO board 420 has a copper foil conductive region disposed thereon, and the copper foil conductive region is utilized to contact an abutting portion of the spring contact plate 430. Thus, the MIMO board 420 can maintain a good communication conductivity in a long-term usage. The spring contact plate 430 herein includes a fixing portion 431 that is fixed to the communication module mainboard 100. The fixing portion 431 transitions into an elastic portion 433 via a bending portion 432. One end of the elastic portion 433 has the abutting portion 434, and the abutting portion 434 relative to the elastic portion 433 represents a convex shape.

Since the main antenna 300 and the MIMO antenna 400 are separately disposed, their interference during sending and receiving information can be reduced, and the overlapping disposal of the main antenna 300 and the MIMO antenna 400 can be avoided, and the thickness of the mobile terminal can be reduced. The MIMO antenna 410 is coupled to the communication module 200 via the coaxial cable 410, so the MIMO antenna 400 can be freely adjusted and disposed anywhere within the mobile terminal, and the internal space of the mobile terminal can get a most optimal utilization. The linkage between the coaxial cable 410 and the communication module 200 employs the removable MIMO board 420 to connect to the spring contact plate 430. Accordingly, free swapping of the communication module 200 is realized. Users can increase or decrease Internet access capability at any time as desired, and can adapt the swap between a 3G (Generation) communication module and a 4G (Generation) communication module. The MIMO antenna 400 is a 4G antenna, which can also meet 3G spectrum requirements.

Said MIMO antenna 400 is a MIMO antenna, i.e. MIMO (Multiple Input Multiple Output) antenna. MIMO technology can exponentially increase a capacity of a communication system and spectrum utilization without increasing bandwidth.

It shall be understood that, applications of the present disclosure are not limited to what described above. Those of ordinary skill in the art may make modifications or variations according to the above description, and all of these modifications and variations shall be covered within the scope of the attached claims of the present disclosure.

What is claimed is:

1. A communication device of a mobile terminal, comprising:
    a communication module mainboard having a communication module disposed thereon;
    a main antenna coupled to the communication module mainboard;
    a multiple input multiple output (MIMO) antenna utilized to enhance signals; and
    a MIMO board coupled to the communication module mainboard;
    wherein the MIMO antenna is coupled to the MIMO board via a coaxial cable, and the main antenna is directly disposed on the communication module mainboard and coupled to the communication module vis wires on the communication module mainboard; and
    wherein the communication module mainboard has a spring contact plate disposed thereon, and the spring contact plate is utilized to make the MIMO board be removably coupled to the communication module mainboard.

2. The communication device of a mobile terminal according to claim 1, wherein the MIMO board is a removable MIMO board.

3. The communication device of a mobile terminal according to claim 1, wherein the main antenna and the MIMO antenna are separately disposed.

4. The communication device of a mobile terminal according to claim 1, wherein the MIMO antenna is a 4G (Generation) antenna.

5. A mobile terminal, comprising the communication device of a mobile terminal as claimed in claim 4.

6. The communication device of a mobile terminal according to claim 1, wherein the MIMO antenna meets 3G (Generation) spectrum requirements.

7. The communication device of a mobile terminal according to claim 1, wherein the spring contact plate comprises;
    a fixing portion fixed to the communication module mainboard;
    a bending portion in which the spring contact plate bends;
    an elastic portion utilized to generate elasticity; and
    an abutting portion utilized to abut the MIMO board;
    wherein the fixing portion transitions into the elastic portion via the bending portion, and one end of the elastic portion is coupled to the abutting portion, and the abutting portion relative to the elastic portion represents a convex shape.

8. The communication device of a mobile terminal according to claim 7, wherein the MIMO board has a copper foil conductive region disposed thereon, and the copper foil conductive region is utilized to contact the abutting portion of the spring contact plate.

9. A communication device of a mobile terminal, comprising:
- a communication module mainboard having a communication module disposed thereon;
- a main antenna coupled to the communication module mainboard;
- a MIMO antenna utilized to enhance signals; and
- a MIMO hoard coupled to the communication module mainboard;
- wherein the MIMO antenna is coupled to the MIMO board via a coaxial cable, and wherein the main antenna and the MIMO antenna are separately disposed in the mobile terminal; and
- wherein the communication module mainboard has a spring contact plate disposed thereon, and the spring contact plate is utilized to make the MIMO board be removably coupled to the communication module mainboard.

10. The communication device of a mobile terminal according to claim 9, wherein the MIMO board is a removable MIMO board.

11. The communication device of a mobile terminal according to claim 9, wherein the MIMO antenna is a 4G antenna.

12. The communication device of a mobile terminal according to claim 9, wherein the MIMO antenna meets 3G spectrum requirements.

13. The communication device of a mobile terminal according to claim 9, wherein the spring contact plate comprises:
- a fixing portion fixed to the communication module mainboard;
- a bending portion in which the spring contact plate bends;
- an elastic portion utilized to generate elasticity; and
- an abutting portion utilized to abut the MIMO board;
- wherein the fixing portion transitions into the elastic portion via the bending portion, and one end of the elastic portion is coupled to the abutting portion, and the abutting portion relative to the elastic portion represents a convex shape.

14. The communication device of a mobile terminal according to claim 13, wherein the MIMO board has a copper foil conductive region disposed thereon, and the copper foil conductive region is utilized to contact the abutting portion of the spring contact plate.

* * * * *